(12) United States Patent
Ratner et al.

(10) Patent No.: US 9,912,948 B2
(45) Date of Patent: Mar. 6, 2018

(54) MACROBLOCK PARTITIONING AND MOTION ESTIMATION USING OBJECT ANALYSIS FOR VIDEO COMPRESSION

(71) Applicant: Lyrical Labs Video Compression Technology, LLC, New York, NY (US)

(72) Inventors: Edward Ratner, Iowa City, IA (US); Jeffrey Alan Keswin, New York, NY (US)

(73) Assignee: Lyrical Labs Video Compression Technology, LLC, New York, NY (US)

( * ) Notice: Subject to any disclaimer, the term of this patent is extended or adjusted under 35 U.S.C. 154(b) by 0 days.

(21) Appl. No.: 15/269,960

(22) Filed: Sep. 19, 2016

(65) Prior Publication Data

US 2017/0078664 A1    Mar. 16, 2017

Related U.S. Application Data

(63) Continuation of application No. 13/868,749, filed on Apr. 23, 2013, now Pat. No. 9,451,253.

(60) Provisional application No. 61/637,447, filed on Apr. 24, 2012, provisional application No. 61/646,479, filed on May 14, 2012.

(51) Int. Cl.
| | |
|---|---|
| *H04N 11/02* | (2006.01) |
| *H04N 19/119* | (2014.01) |
| *H04N 19/167* | (2014.01) |
| *H04N 19/20* | (2014.01) |
| *H04N 19/176* | (2014.01) |
| *H04N 19/149* | (2014.01) |
| *H04N 19/51* | (2014.01) |
| *H04N 19/172* | (2014.01) |

(52) U.S. Cl.
CPC ......... *H04N 19/119* (2014.11); *H04N 19/149* (2014.11); *H04N 19/167* (2014.11); *H04N 19/172* (2014.11); *H04N 19/176* (2014.11); *H04N 19/20* (2014.11); *H04N 19/51* (2014.11)

(58) Field of Classification Search
CPC .................................................... H04N 19/119
USPC ...................................... 375/240.01–240.29
See application file for complete search history.

(56) References Cited

U.S. PATENT DOCUMENTS

| | | | | |
|---|---|---|---|---|
| 5,608,458 | A * | 3/1997 | Chen ...................... | H04N 19/51 348/699 |
| 6,314,209 | B1 * | 11/2001 | Kweon ................... | G06T 3/602 375/E7.228 |
| 6,404,814 | B1 * | 6/2002 | Apostolopoulos ..... | H04N 19/20 375/240.08 |
| 7,324,596 | B2 * | 1/2008 | Gallant .................. | H04N 5/145 348/E5.066 |
| 9,021,137 | B2 * | 4/2015 | Barton ................ | H04L 67/1095 370/401 |
| 2003/0122967 | A1 * | 7/2003 | Kondo ..................... | H04N 5/21 348/607 |
| 2004/0044836 | A1 * | 3/2004 | Wong ...................... | G06F 12/02 711/103 |

(Continued)

*Primary Examiner* — Leron Beck
(74) *Attorney, Agent, or Firm* — Faegre Baker Daniels LLP

(57) ABSTRACT

A method and device for encoding video including determining objects within a frame at least partially based on movement characteristics of underlying pixels and partitioning the frame into blocks by considering a plurality of partitioning options, such partitioning favoring options that result in different objects being placed in different blocks.

18 Claims, 5 Drawing Sheets

(56) References Cited

U.S. PATENT DOCUMENTS

| | | | |
|---|---|---|---|
| 2008/0126278 A1* | 5/2008 | Bronstein | H04N 19/176 706/17 |
| 2009/0080527 A1* | 3/2009 | Zhao | H04N 19/61 375/240.16 |
| 2009/0296819 A1* | 12/2009 | Oshikiri | H04N 19/117 375/240.16 |
| 2012/0026346 A1* | 2/2012 | Lee | H04N 5/23222 348/208.1 |

* cited by examiner

MACROBLOCK PARTITIONING AND MOTION ESTIMATION USING OBJECT ANALYSIS FOR VIDEO COMPRESSION

PRIORITY

The present application is continuation of U.S. application Ser. No. 13/868,749, filed on Apr. 23, 2013, and issuing as U.S. Pat. No. 9,451,253 on Sep. 20, 2016, which is a non-provisional application claiming priority to U.S. Provisional Patent Application Ser. Nos. 61/637,447 (filed Apr. 24, 2012) and 61/646,479 (filed May 14, 2012), the disclosures of which are expressly incorporated herein.

BACKGROUND

Video is ubiquitous on the Internet. In fact, many people today watch video exclusively online. And, according to the latest statistics, almost 90% of Internet traffic is attributable to video. All of this is possible, in part, due to sophisticated video compression. Video compression, thusly, plays an important role in the modern world's communication infrastructure. By way of illustration, uncompressed video at standard resolution (i.e., 640×480) would require 240 Mbps of bandwidth to transmit. This amount of bandwidth, for just a standard video, exceeds significantly the capacity of today's infrastructure and, for that matter, the widely available infrastructure of the foreseeable future.

Modern video compression techniques take advantage of the fact that information content in video exhibits significant redundancy. Video exhibits temporal redundancy inasmuch as, in a new frame of a video, most content was present previously. Video also exhibits significant spatial redundancy, inasmuch as, in a given frame, pixels have color values similar to their neighbors. The first commercially widespread video coding methods, MPEG1 and MPEG2, took advantage of these forms of redundancy and were able to reduce bandwidth requirements substantially.

For high quality encoding, MPEG1 generally cut from 240 Mbps to 6 Mbps the bandwidth requirement for standard definition resolution. MPEG2 brought the requirement down further to 4 Mbps. MPEG2 is resultantly used for digital television broadcasting all over the world. MPEG1 and MPEG2 each took advantage of temporal redundancy by leveraging block-based motion compensation. To compress using block-based motion compensation, a new frame that is to be encoded by an encoder is broken up into fixed-size, 16×16 pixel blocks, labeled macroblocks. These macroblocks are non-overlapping and form a homogenous tiling of the frame. When encoding, the encoder searches for the best matching macroblock of a previously encoded frame, for each macroblock in a new frame. In fact, in MPEG1 and MPEG2 up to two previously encoded frames can be searched. Once a best match is found, the encoder establishes and transmits a displacement vector, known in this case as a motion vector, referencing and, thereby, approximating, each macroblock.

MPEG1 and MPEG2, as international standards, specified the format of the motion vector coding but left the means of determination of the motion vectors to the designers of the encoder algorithms. Originally, the absolute error between the actual macroblock and its approximation was targeted for minimization in the motion vector search. However, later implementations took into account the cost of encoding the motion vector, too. Although MPEG1 and MPEG2 represented significant advances in video compression, their effectiveness was limited, due, largely, to the fact that real video scenes are not comprised of moving square blocks.

Realistically, certain macroblocks in a new frame are not represented well by any macroblocks from a previous frame and have to be encoded without the benefit of temporal redundancy. With MPEG1 and MPEG2, these macroblocks could not be compressed well and contributed disproportionately to overall bitrate.

The newer generation of video compression standards, such as H.264 and Google's VP8, has addressed this temporal redundancy problem by allowing the 16×16 macroblocks to be partitioned into smaller blocks, each of which can be motion compensated separately. The option is to go, potentially, as far down as 4×4 pixel block partitions. The finer partitioning potentially allows for a better match of each partition to a block in a previous frame. However, this approach incurs the cost of coding extra motion vectors. The encoders, operating within standards, have the flexibility to decide how the macroblocks are partitioned and how the motion vectors for each partition are selected. Regardless of path, ultimately, the results are encoded in a standards compliant bitstream that any standards compliant decoder can decode.

Determining precisely how to partition and motion compensate each macroblock is complex, and the original H.264 test model used an approach based on rate-distortion optimization. In rate-distortion optimization, a combined cost function, including both the error for a certain displacement and the coding cost of the corresponding motion vector, is targeted for minimization. To partition a particular macroblock, the total cost-function is analyzed. The total cost function contains the errors from motion compensating each partition and the costs of encoding all the motion vectors associated with the specific partitioning. The cost is given by the following equation:

$$F(v_1, \ldots, v_N) = \Sigma_{partitions} \text{Error}_{partition} + \alpha \Sigma_{partitions} R(v_{partition}) \quad (1)$$

where $\alpha$ is the Langrange multiplier relating rate and distortion, $\Sigma_{partitions}\text{Error}_{partition}$ is the cost associated with the mismatch of the source and the target, and $$\sum_{partitions} R(v_{partitions})$$

is the cost associated with encoding the corresponding motion vectors.

For each possible partitioning, the cost function F is minimized as a function of motion vectors v. For the final decision, the optimal cost functions of each potential partitioning are considered, and the partitioning with lowest overall cost function is selected. The macroblocks are encoded in raster scan order, and this choice is made for each macroblock as it is encoded. The previous macroblocks impact the current macroblock by predicting differentially the motion vectors for the current macroblock and, thus, impacting the coding cost of a potential candidate motion vector. This approach is now used de facto in video compression encoders for H.264 and VP8 today.

In an exemplary and non-limited embodiment, aspects of the disclosure are embodied in a method of encoding video including determining objects within a frame at least partially based on movement characteristics of underlying pixels and partitioning the frame into blocks by considering a plurality of partitioning options, such partitioning favoring options that result in different objects being placed in different blocks.

In another example, aspects of the present disclosure are embodied in a partitioner operable to partition a frame into blocks by considering a plurality of partitioning options, such partitioning favoring options that result in different objects being placed in different blocks.

In yet another example, aspect of the present disclosure are embodied in a computer readable media having instructions thereon that when interpreted by a processor cause the processor to determine objects within a frame at least partially based on movement characteristics of underlying pixels; and partition a frame into blocks by considering a plurality of partitioning options, such partitioning favoring options that result in different objects being placed in different blocks.

DETAILED DESCRIPTION

The methods and systems described herein improve on the currently prevailing compression approach by taking a more global view of the encoding of a frame of video. Using the traditional rate-distortion optimization approach, no weight is given to the fact that the choice of partitions and their corresponding motion vectors will impact subsequent macroblocks. The result of this comes in the form of higher cost for encoding motion vectors and potential activation of the de-blocking filter, negatively impacting overall quality.

Figure 1:
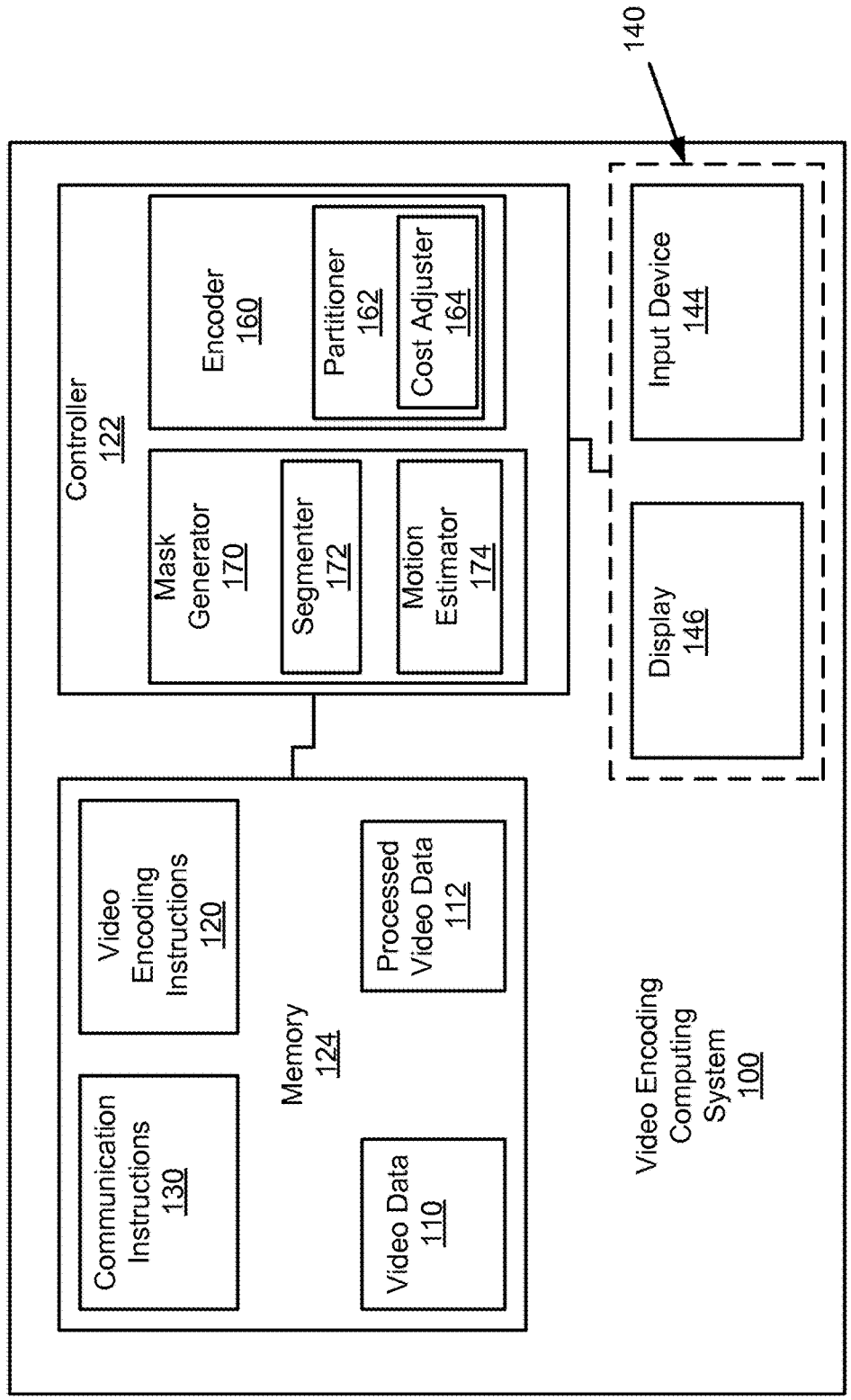
FIG. 1 illustrates an exemplary video encoding system.
Figure 2:
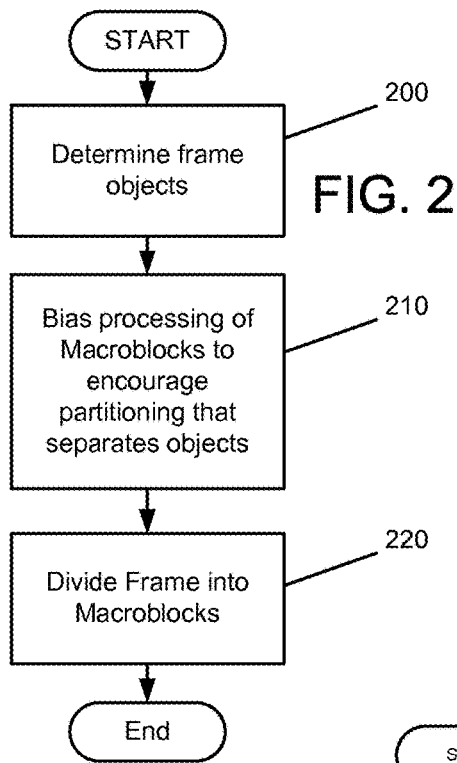
FIG. 2 illustrates an exemplary operation conducted by the system of FIG. 1.
Figure 4:
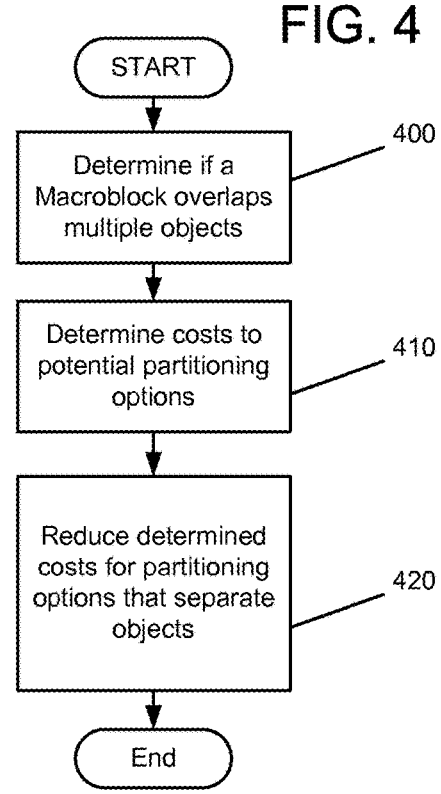
FIG. 4 illustrates another exemplary operation conducted by the system of FIG. 1.
Figure 3:
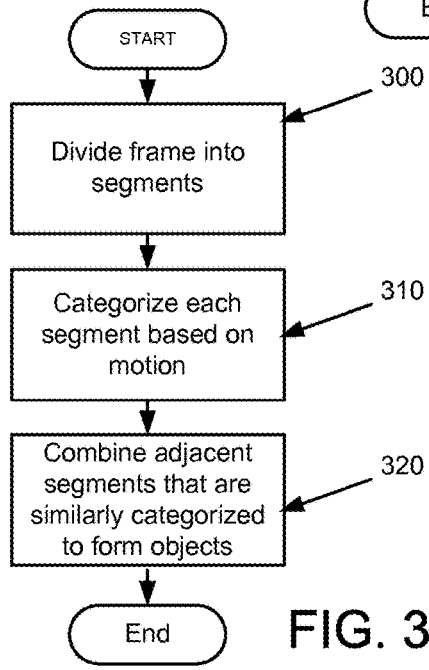
FIG. 3 illustrates another exemplary operation conducted by the system of FIG. 1.
Figure 5:
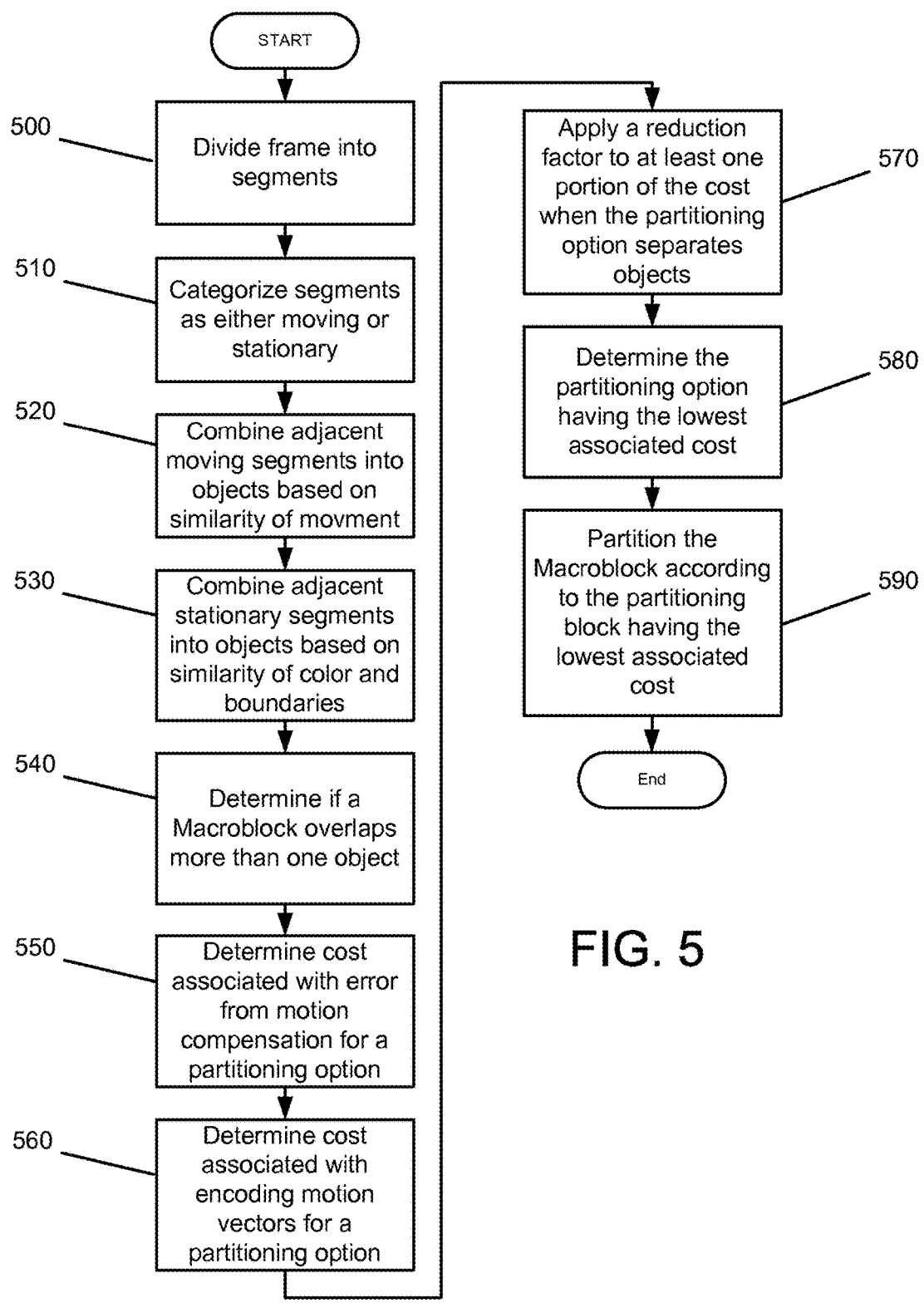
FIG. 5 illustrates another exemplary operation conducted by the system of FIG. 1.

Referring to FIG. 1, an exemplary video encoding computing system 100 is represented. Video encoding computing system 100 includes a controller 122, memory 124, and interfaces 140. In the illustrated embodiment, video encoding computing system 100 is a single system. In another embodiment, video encoding computing system 100 includes two or more systems in communication with each other.

Controller 122 is illustratively a computer processor or multiple processors. Controller 122 includes a mask generator 150 and encoder 160. Each of mask generator 150 and encoder 160 are illustratively provided as controller 122 executing instructions. Mask generator 150 includes segmenter 152 and motion estimator 154. Encoder 160 includes partitioner 162. Partitioner 162 includes cost adjuster 164. Controller 122 has access to memory 124.

Memory 124 includes communication instructions 130 which when executed by controller 122 permit video encoding computing system 100 to communicate with other computing devices over a network. Although illustrated as software, communication instructions 130 may be implemented as software, hardware (such as state logic), or a combination thereof. Video encoding computing system 100 further includes data, such as at least one video file 110, to be encoded which is received from a client computing system and is stored on memory 124. The video file is to be encoded and subsequently stored as a processed video file 112. Exemplary video encoding computing systems 100 include desktop computers, laptop computers, tablet computers, cell phones, smart phones, and other suitable computing devices. In the illustrative embodiment, video encoding computing system 100 includes memory 124 which may be multiple memories accessible by controller 122.

Memory 124 associated with the one or more processors of controller 122 may include, but is not limited to, memory associated with the execution of software and memory associated with the storage of data. Memory 124 includes computer readable media. Computer-readable media may be any available media that may be accessed by one or more processors of controller 122 and includes both volatile and non-volatile media. Further, computer readable-media may be one or both of removable and non-removable media. By way of example, computer-readable media may include, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which may be used to store the desired information and which may be accessed by controller 122.

Memory 124 further includes video encoding software 120. Video encoding software 120 relates to the processing of video file 110. Exemplary processing sequences of the video encoding software are provided below. Although illustrated as software, video encoding software 120 may be implemented as software, hardware, or a combination thereof.

Video encoding computing system 100 further includes a user interface 140. User interface 140 includes one or more input devices 144 and one or more output devices, illustratively a display 146. Exemplary input devices include a keyboard, a mouse, a pointer device, a trackball, a button, a switch, a touch screen, and other suitable devices which allow an operator to provide input to video encoding computing system 100. Exemplary output devices include a display, a touch screen, a printer, and other suitable devices which provide information to an operator of video encoding computing system 100.

In one embodiment, the computer systems disclosed in U.S. application Ser. No. 13/428,707, filed Mar. 23, 2012, titled VIDEO ENCODING SYSTEM AND METHOD, the disclosure of which is expressly incorporated by reference herein, utilize the video encoding processing sequences described herein to encode video files.

Video Encoding Processing Sequences

In one embodiment, a two-pass approach through the video is implemented. In the first pass, video is analyzed both for coherently moving and for stationary objects. With respect to each frame of video, mask generator 170 generates a mask. Mask generator 170 assigns each pixel of a frame to either a moving or a stationary object. Objects are determined (block 200) and enumerated with each objects numeral corresponding to the pixel value in the mask. Moreover, via motion estimator 174, associated metadata specifies which objects are in motion.

More specifically, the first pass includes two steps. In the first step, segmenter 172 receives a frame 600 and breaks up the frame into image segments 700 (FIGS. 7a-c)(Blocks 300, 500).

A number of different automatic image segmentation methods are known to practitioners in the field. Generally, the techniques use image color and corresponding gradients to subdivide an image into segment regions that have similar color and texture. Two examples of image segmentation techniques include the watershed algorithm and optimum cut partitioning of a pixel connectivity graph. In the specific embodiment, Canny edge detection is used to detect edges on an image for optimum cut partitioning. Segments are then created using the optimum cut partitioning of the pixel connectivity graph.

The second step is segment-based motion estimation, where the motion of the segments is determined. Once the segments are created, motion estimator 174 estimates motion of the segment between frames, with the current frame in the temporal sequence serving as the source frame and the subsequent frame in the temporal sequence serving as the target frame. A number of motion estimation techniques are known to practitioners in the field. Two examples are optical pixel flow and feature tracking. In the specific embodiment, we use feature tracking. Speeded Up Robust Features (SURF) are extracted from both the source image and the target image. The individual features of the two images are then compared using a Euclidean metric to establish a correspondence. This generates a motion vector for each feature. A motion vector for a segment is the median of all of the segment's features. Accordingly, each segment is categorized based on its motion properties (Block 310). Such categorization includes categorizing each segment as either moving or stationary (Block 510)

Finally, adjacent segments, as understood from the foregoing two steps, are combined into objects (Block 320). If the segments are moving, they are combined based on similarity of motion (Block 520). If the segments are stationary, they are combined based on similarity of color and the percentage of shared boundaries (Block 530). Objects are enumerated, and a mask is generated for a given frame.

In the second pass, the actual encoding is performed by encoder 160. The object mask generated by the first pass is available to encoder 160. Partitioner 162 operates to determine which macroblocks are kept whole and which macroblocks are further divided into smaller partitions. Partitioner 162 makes the partitioning decision by taking object mask information into account. Partitioner 162 illustratively "decides" between multiple partitioning options.

Partitioner 162 determines if a macroblock overlaps multiple objects of the mask (Block 400, 540). The costs associated with each partitioning option are determined (Block 410). In one example, costs associated with error from motion compensation for a particular partitioning decision is determined (Block 550). Costs associated with encoding motion vectors for a particular partitioning decision are also determined (Block 560).

In the case where a macroblock overlaps two objects, cost adjuster 164 favors the partitioning option that separates the two objects by adjusting (reducing) its cost function via multiplying it by a coefficient, $\beta$, which is less than 1 (Block 420, 570). Stated differently, the processing of macroblocks is biased to encourage partitioning that separates objects (block 210). $\beta$ is a learned constant and, in the specific embodiment, depends on whether one of two objects is moving, both objects are moving, or both are stationary. In the case of a macroblock containing more than two objects, the cost function of a partition that separates three of the objects is further scaled by $\beta_2$. This approach is applied potentially indefinitely for an indefinite number of additional objects within a macroblock. In the specific embodiment, $\beta$'s past $\beta_2$ are equal to 1. The partition corresponding to the best cost function value post-scaling is determined (block 580), selected, and processed (Block 590).

The specific cost functions are given by:

$$F(v_1, \ldots, v_n)_{objects\ separated} = \beta\left(\sum_{partitions} Error_{partition} + \alpha \sum_{partitions} R(v_{partition})\right)$$

$$F(v_1, \ldots, v_n)_{objects\ together} = \sum_{partitions} Error_{partition} + \alpha \sum_{partitions} R(v_{partition})$$

Partitioning that favors separation of objects is hereby more likely because $\beta$ less than one gives such partitioning a lower cost. In other words, additional present real cost is taken on in anticipation that such present cost results in later savings. Moreover, this leads potentially to less expensive encoding of macroblocks reached subsequently when they contain portions of one of the objects in the considered macroblock. In the specific embodiment, the error metric chosen (i.e., the first addend) is the sum of absolute differences. The coding cost of the motion vectors (i.e., the second addend) is derived by temporarily quantifying the vectors' associated bitrates using Binary Adaptive Arithmetic Coding. Nothing is written to the bitstream until the final choice for the macroblock is made. Once such macroblock choice is made, along with the decisions for all other macroblocks, the frame is divided into macroblocks (Block 220).

Figure 7A:
FIGS. 7a-c illustrate the frames of 6a-c after being processed to create segments therein.
Figure 7B:
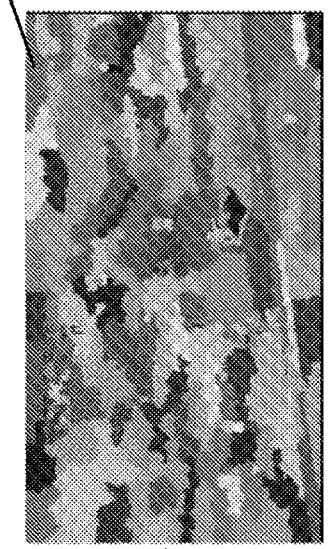
Figure 7C:
Figure 6A:
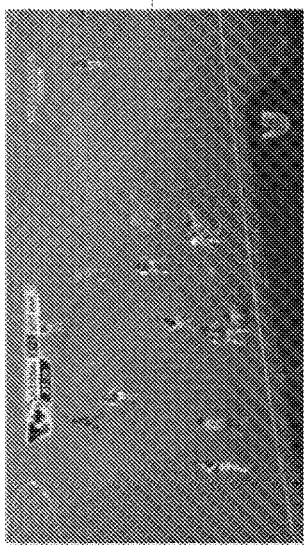
FIGS. 6a-c illustrate exemplary video frames suitable for encoding.
Figure 6B:
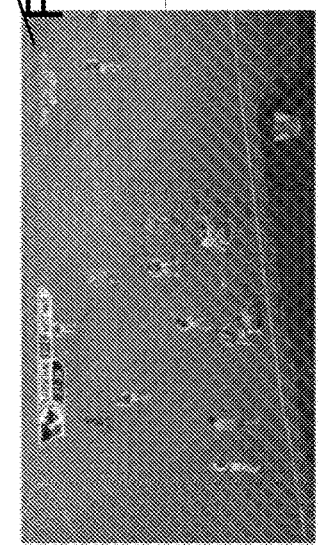
Figure 6C:
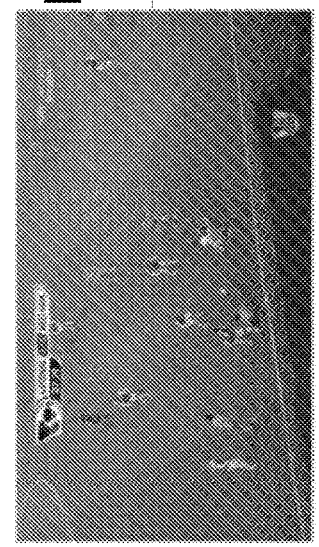

Having described the hardware and process directed by the instructions stored in memory 124, an exemplary processing will now be described with reference to FIGS. 6-8. FIGS. 6a-c show three consecutive frames 600 of video information depicting a soccer match. FIGS. 7a-c show those three frames broken up into segments 700 based on colors, edges, and textures.

Figure 8A:
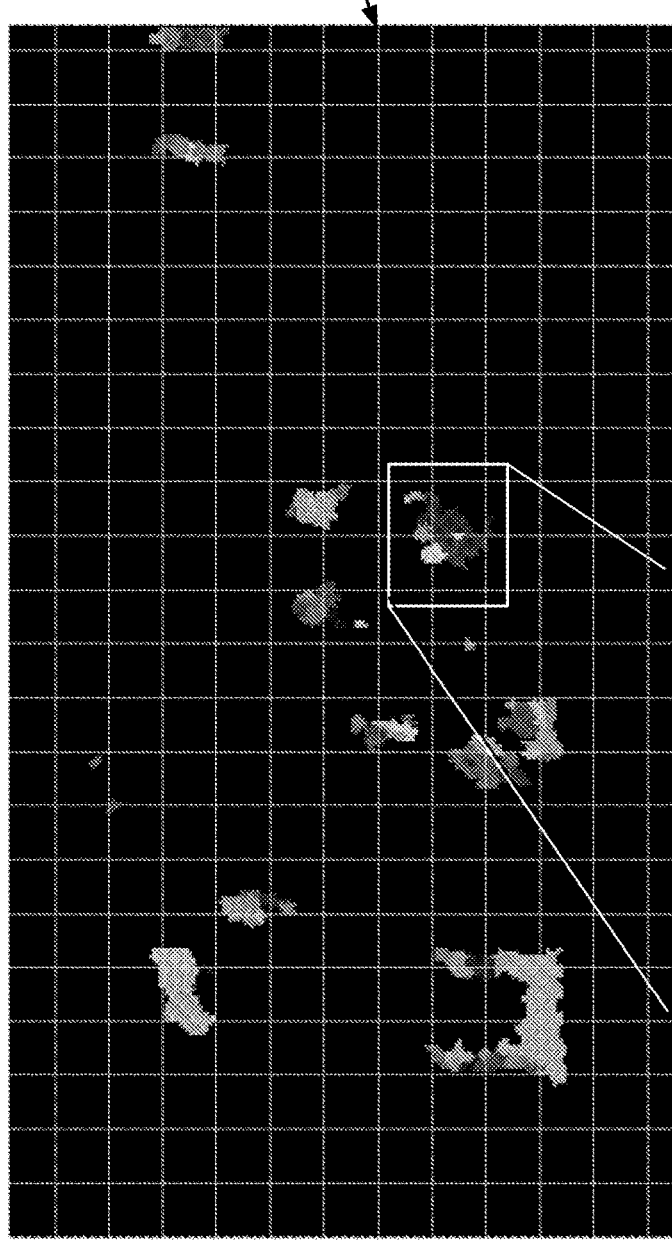
FIGS. 8a-c illustrate objects formed from the segments of FIGS. 7a-c and partitioning blocks.
Figure 8C:
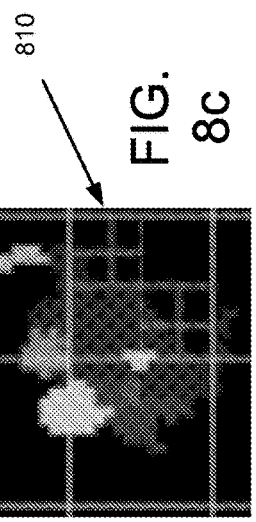
Figure 8B:
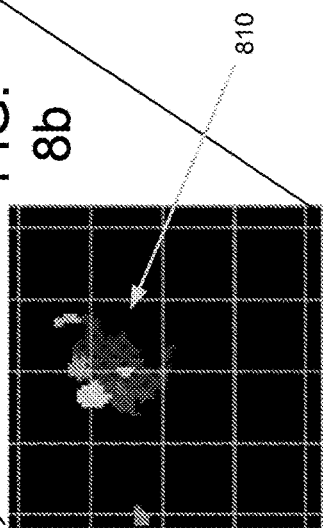

Based on analysis of the motion of the segments from frame to frame, segments are grouped into objects. FIG. 8a shows one such frame with objects thereon. It is specifically noted that the majority of the frame depicts the green grass of the field that does not move from frame to frame. Thus, this lack of motion and consistency of color results in the grass all being grouped as a single object (background object). The non-background objects correspond with the images of the players. FIG. 8b is an enlarged area of FIG. 8a. FIG. 8c is an enlarged area of FIG. 8b showing a macroblock of interest 810.

In the current example, macroblocks are illustratively 16 pixels×16 pixels in size. FIGS. 8a-c show an overlay that depicts the 16×16 macroblock partitioning 800. Encoder 160 has to decide whether to motion compensate the 16×16 macroblock 810 as one whole piece or subdivide it into smaller pieces. FIG. 8c shows a first order subdivision that divides macroblock 810 into four 8 pixel×8 pixel blocks. FIG. 8c also shows a further subdivision of two 8×8 blocks (top right and lower left) into four 4 pixel×4 pixel blocks.

In the present example, the cost calculation has determined that the changes between frames warrants subdivision within the 16×16 macroblock to give four 8×8 macroblocks. Similar cost calculations are performed for each resulting 8×8 macroblock. It should be appreciated that two of the 8×8 macroblocks (upper left and lower right) are deemed to be homogenous enough and/or stationary enough to not warrant further division. However, the other two 8×8 macroblocks (those that contain the majority of the edges of the objects) have satisfied the criteria (cost calculation) for further division. As previously noted, the cost calculation is biased to favor division of objects.

The above detailed description and the examples described therein have been presented for the purposes of illustration and description only and not for limitation. For example, the operations described may be done in any suitable manner. The method may be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine, or dedicated logic capable of producing the same effect are also contemplated.

The software operations described herein can be implemented in hardware such as discrete logic fixed function circuits including but not limited to state machines, field programmable gate arrays, application specific circuits or other suitable hardware. The hardware may be represented in executable code stored in non-transitory memory such as RAM, ROM or other suitable memory in hardware descriptor languages such as but not limited to RTL and VHDL or any other suitable format. The executable code when executed may cause an integrated fabrication system to fabricate an IC with the operations described herein Also, integrated circuit design systems/integrated fabrication systems (e.g., work stations including, as known in the art, one or more processors, associated memory in communication via one or more buses or other suitable interconnect and other known peripherals) are known that create wafers with integrated circuits based on executable instructions stored on a computer readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic, software, and circuits described herein may also be produced as integrated circuits by such systems using the computer readable medium with instructions stored therein. For example, an integrated circuit with the aforedescribed software, logic, and structure may be created using such integrated circuit fabrication systems. In such a system, the computer readable medium stores instructions executable by one or more integrated circuit design systems that causes the one or more integrated circuit design systems to produce an integrated circuit.

The invention claimed is:

1. A method of encoding video comprising:
   determining objects within a frame, such determining being at least partially based on movement characteristics of underlying pixels;
   determining a plurality of costs, each of the plurality of costs being associated with one of a plurality of partitioning options for partitioning the frame into blocks;
   applying a scaling factor to each cost to determine a plurality of scaled costs, wherein each scaling factor is based on whether a partitioning option associated with a cost to which the scaling factor is applied separates objects within a frame;
   selecting a partitioning option having a lowest scaled cost; and
   partitioning the frame using the selected partitioning option.

2. The method of claim 1, wherein applying a scaling factor causes the selection of a partitioning option that would not have been selected absent the application of the scaling factor.

3. The method of claim 1, wherein each of the plurality of costs is a combination of the cost of errors from motion compensating the second block and the costs of encoding all motion vectors associated with the second block.

4. The method of claim 1, further comprising: dividing the frame into segments; categorizing segments as either moving or stationary; and combining adjacent moving segments into objects based on similarity of movement.

5. The method of claim 4, further comprising combining adjacent stationary segments into objects based on similarity of color and boundaries.

6. The method of claim 4, further comprising determining if a block overlaps more than one object.

7. A partitioning controller configured to:
   receive data associated with a frame and data associated with one or more determined objects within the frame;
   determine a plurality of costs, each of the plurality of costs being associated with one of a plurality of partitioning options for partitioning the frame into blocks;
   apply a scaling factor to each cost to determine a plurality of scaled costs, wherein each scaling factor is based on whether a partitioning option associated with a cost to which the scaling factor is applied separates objects within a frame;
   select a partitioning option having a lowest scaled cost; and
   partition the frame using the selected partitioning option.

8. The controller of claim 7, wherein the application of a scaling factor causes the partitioner to select a partitioning option that would not have been selected absent the application of the scaling factor.

9. The controller of claim 7, further comprising a mask generator configured to determine the objects within the frame.

10. The controller of claim 9, wherein the mask generator comprises a segmenter operable to divide the frame into segments.

11. The controller of claim 10, further comprising a motion estimator operable to determine motion characteristics of the segments.

12. The controller of claim 11, wherein the mask generator is configured to combine segments into objects based upon similarity of at least one of motion, color and percentage of shared boundaries.

13. A non-transitory computer readable media having instructions thereon that when executed by a processor cause the processor to:
   determine objects within a frame at least partially based on movement characteristics of underlying pixels;
   determine a plurality of costs, each of the plurality of costs being associated with one of a plurality of partitioning options for partitioning the frame into blocks;
   apply a scaling factor to each cost to determine a plurality of scaled costs, wherein each scaling factor is based on whether a partitioning option associated with a cost to which the scaling factor is applied separates objects within a frame;

select a partitioning option having a lowest scaled cost; and partition the frame using the selected partitioning option.

14. The non-transitory media of claim 13, wherein the application of a scaling factor causes the selection of a partitioning option that would not have been selected absent the application of the scaling factor.

15. The non-transitory media of claim 13, wherein each of the plurality of costs is a combination of the cost of errors from motion compensating the second block and the costs of encoding all motion vectors associated with the second block.

16. The method of claim 1, wherein applying a scaling factor to each cost comprises applying a plurality of scaling factors to a cost, wherein the number of the plurality of scaling factors applied to the cost equals the number of objects within the frame that the partitioning option, associated with the cost, separates into different blocks.

17. The controller of claim 7, wherein to apply a scaling factor to each cost, the controller is configured to apply a plurality of scaling factors to a cost, wherein the number of the plurality of scaling factors applied to the cost equals the number of objects within the frame that the partitioning option, associated with the cost, separates into different blocks.

18. The non-transitory media of claim 13, the non-transitory media having instructions thereon that when executed interpreted by a processor cause the processor to apply a plurality of scaling factors to a cost, wherein the number of the plurality of scaling factors applied to the cost equals the number of objects within the frame that the partitioning option, associated with the cost, separates into different blocks.

* * * * *